United States Patent
Linjama et al.

(10) Patent No.: US 10,957,302 B2
(45) Date of Patent: Mar. 23, 2021

(54) SEAT ARRANGED FOR ENHANCED SOUND PERCEPTION VIA VIBRATION

(71) Applicant: Flexound Systems Oy, Espoo (FI)

(72) Inventors: Jukka Linjama, Espoo (FI); Tommi Immonen, Vantaa (FI)

(73) Assignee: FLEXOUND SYSTEMS OY, Espoo (FI)

( * ) Notice: Subject to any disclaimer, the term of this patent is extended or adjusted under 35 U.S.C. 154(b) by 21 days.

(21) Appl. No.: 16/287,475

(22) Filed: Feb. 27, 2019

(65) Prior Publication Data

US 2019/0266993 A1 Aug. 29, 2019

(30) Foreign Application Priority Data

Feb. 27, 2018 (EP) .................................. 18158736

(51) Int. Cl.
| | | |
|---|---|---|
| *G10K 11/24* | (2006.01) | |
| *A47C 7/35* | (2006.01) | |
| *A47C 7/62* | (2006.01) | |
| *H04R 5/02* | (2006.01) | |
| *B06B 3/00* | (2006.01) | |

(Continued)

(52) U.S. Cl.
CPC ................ *G10K 11/24* (2013.01); *A47C 7/35* (2013.01); *A47C 7/62* (2013.01); *H04R 5/023* (2013.01); *B06B 3/00* (2013.01); *B06B 2201/70* (2013.01); *B61D 33/0014* (2013.01); *H04R 1/028* (2013.01); *H04R 2400/03* (2013.01)

(58) Field of Classification Search
None
See application file for complete search history.

(56) References Cited

U.S. PATENT DOCUMENTS 4,064,376 A * 12/1977 Yamada ................. A47C 7/727
381/152
4,507,816 A * 4/1985 Smith, Jr. ............ A47C 21/003
381/151

(Continued)

FOREIGN PATENT DOCUMENTS

| CN | 107 080 398 A | 8/2017 |
|---|---|---|
| EP | 3 097 703 A | 11/2016 |

(Continued)

OTHER PUBLICATIONS

EP Search Report, dated Aug. 7, 2018, from corresponding EP18158736 application.

*Primary Examiner* — David R Dunn
*Assistant Examiner* — Christopher E Veraa
(74) *Attorney, Agent, or Firm* — Nixon & Vanderhye

(57) ABSTRACT

The invention relates to a seat arranged for enhanced sound perception via vibration including a padding and a sound reproduction assembly (20), which includes at least one vibration source (26), at least one elastic element (16, 21) and at least one frame structure (18, 22), which sound reproduction assembly is at least partially arranged inside the padding. The elastic element/-s (16, 21) are nonhomogenous element/-s and located in contact with the frame structure (18, 22) and the vibration source (26) and configured to provide elastically and mechanically tuned mounting and that the elastic element/-s are configured to create at least lateral vibration to the surface of the seat.

19 Claims, 4 Drawing Sheets

(51) Int. Cl.
   *B61D 33/00* (2006.01)
   *H04R 1/02* (2006.01)

(56) References Cited

U.S. PATENT DOCUMENTS

| | | | | |
|---|---|---|---|---|
| 5,097,821 A * | 3/1992 | Eakin | ............... | A61H 23/0236 601/47 |
| 5,101,810 A * | 4/1992 | Skille | ............... | A61H 23/0236 5/904 |
| 5,113,852 A * | 5/1992 | Murtonen | ............... | A61H 23/0236 601/47 |
| 5,314,403 A * | 5/1994 | Shaw | ............... | A61H 23/0236 297/217.1 |
| 5,387,026 A * | 2/1995 | Matsuhashi | ............... | A47C 7/72 297/217.4 |
| 5,604,816 A * | 2/1997 | Totani | ............... | A61H 23/0236 381/396 |
| 5,706,358 A * | 1/1998 | Ashworth | ............... | H04R 1/025 381/152 |
| 6,155,976 A * | 12/2000 | Sackner | ............... | A47C 21/006 5/600 |
| 6,953,439 B1 * | 10/2005 | Kabemba | ............... | A61H 23/0236 5/904 |
| 7,159,938 B1 * | 1/2007 | Shiraishi | ............... | B60N 2/70 297/217.4 |
| 7,553,288 B2 * | 6/2009 | Cohen | ............... | A61H 23/0236 181/144 |
| 7,597,390 B2 * | 10/2009 | Galati, Jr. | ............... | A47C 1/04 297/182 |
| 7,722,116 B2 * | 5/2010 | Takada | ............... | H04R 1/028 297/217.4 |
| 8,668,045 B2 * | 3/2014 | Cohen | ............... | A61H 23/0236 181/150 |
| 8,761,417 B2 * | 6/2014 | Oser | ............... | H04R 5/023 381/152 |
| 2003/0067197 A1 * | 4/2003 | Komatsu | ............... | A47C 7/62 297/217.3 |
| 2004/0251747 A1 | 12/2004 | Bouchard | | |
| 2007/0257529 A1 * | 11/2007 | Matsuhashi | ............... | H04R 5/023 297/217.4 |
| 2009/0326424 A1 * | 12/2009 | Shrestha | ............... | A61H 23/0236 601/47 |

FOREIGN PATENT DOCUMENTS

| | | |
|---|---|---|
| EP | 3 244 628 A | 11/2017 |
| EP | 3 244 633 A | 11/2017 |
| WO | 2006034125 A | 3/2006 |

\* cited by examiner

SEAT ARRANGED FOR ENHANCED SOUND PERCEPTION VIA VIBRATION

BACKGROUND OF THE INVENTION

Field of the Invention

The present invention relates to pieces of seat that enable enhanced sound perception via vibration. In particular, the present invention relates to a seat arranged for joint production of vibration and sound according to the preamble of claim 1.

In this text; in the description and the claims by the term "seat" is meant all types of pieces of furniture and like for buildings of domestic or public uses and for vehicles, such as cars, trains, vessels etc., for example chairs, beds, matrasses, coaches etc. which are for users typically to sit or lay and to which the users have a skin contact of advantageously of larger skin areas such as skin of the back or of the behind or of the arms or of the thighs of the user.

Description of the Related Art

It is known from prior art to generate vibration effect, especially low frequency effects (LFE) from 20 to 120 Hz, to pieces of seat by using mechanical actuators and/or large loudspeakers. Typically, the vibration actuators are mounted in chairs on seat rests and or on back rests at lumbar area of the user.

In EP patent application publication 3097703 is disclosed an apparatus for comprehensive perception of sound, preferably a cushion, where vibration and sound is produced with a mechanical device wrapped inside a padding, wherein the device radiates sound by generating mechanical vibration directly to the padding that can be felt and listened on the outer surface of the padding, and radiates airborne sound through the padding, which device in order to avoid acoustical and mechanical resonances comprises an acoustically denser and lossy layer and a layer that is acoustically less dense and porous and which device further comprises at least one board, and the vibration of the board is generated using at least one vibrating mechanical actuator.

In EP patent application publication 3244628 is disclosed an apparatus for joint production of vibration and sound, the apparatus comprising means for jointly producing vibration and sound to reproduce an input audio signal provided as input thereto, said means arranged inside a padding to generate mechanical vibration that is perceivable as a vibration and sound on at least one outer surface of the padding and to radiate a sound through said at least one outer surface of the padding; and means for regulating perceivable intensity of vibration in dependence of at least one characteristics of the input audio signal. In this know apparatus the means for jointly producing vibration and sound may comprise at least one mechanical actuator and at least one board, wherein said at least one mechanical actuator is arranged to vibrate said at least one board in accordance with the input audio signal.

In WO2006034125 patent application publication is disclosed a pad comprising: a speaker module including an acoustic speaker and a layered plurality of materials having different degrees of acoustic conductance and compressibility, said speaker being supported within and enclosed by the plurality of materials.

In EP patent application publication 3 244 633 is disclosed a seat arranged for joint production of vibration and sound, the seat comprising vibration means for jointly producing vibration and sound to reproduce an input audio signal provided as input thereto, said vibration means arranged inside a padding of the seat to generate mechanical vibration that is perceivable as a vibration and sound on at least one outer surface of the padding and to radiate a sound through said at least one outer surface of the padding and said vibration means comprising at least one mechanical actuator and at least one board, wherein said at least one mechanical actuator is arranged to vibrate said at least one board in accordance with the input audio signal, and isolation means for mechanically isolating the vibration means from adjacent structures. The board comprises at least one rigid or substantially rigid board arranged in one or more of the following: a backrest of the seat, a seat part of the seat; an armrest of the seat, a footrest of the seat, a headrest of the seat. The mechanical actuator comprises at least two mechanical actuators for reproducing a spatial sound. By this known a sound reproduction arrangement is provided that, on one hand, enables provision of strong low frequency effects without causing severe disturbances to adjacent spaces while on the other hand enables faithful reproduction of the spatial/directional component of the soundscape at a reasonable complexity and cost. Thus, the arrangement with sound board actuator with elastic mounting to a chair provides a chair that vibrates and is mechanically isolated from the floor.

SUMMARY OF THE INVENTION

An object of the invention is to create a seat arranged for enhanced sound perception via vibration, in which the disadvantages and problems relating transmitting vibration to larger human body areas efficiently are eliminated or at least minimized.

In particular, an object of the invention is to create a seat arranged for enhanced sound perception via vibration, in which the disadvantages and problems relating transmitting vibration to larger human body areas efficiently with only one primary actuation location are eliminated or at least minimized.

In order to achieve the above objects and those described later the seat arranged for joint production of vibration and sound according to the invention is mainly characterized by the features of claim 1. In the dependent claims additional advantageous features and aspects of the invention are defined.

In accordance with the invention the seat arranged for enhanced sound perception via vibration comprises a padding and a sound reproduction assembly, which comprises at least one vibration source, at least one elastic element and at least one frame structure, which sound reproduction assembly is at least partially arranged inside the padding, wherein the elastic element/-s are non-homogenous element/-s and located in contact with the frame structure and the vibration source and configured to provide elastically and mechanically tuned mounting and that the elastic element/-s are configured to create at least lateral vibration to the surface of the seat. Normal and lateral directions here are defined with respect to the surface plane of the part in question.

According to an advantageous feature of the invention the seat comprises at least a back rest, a seat rest or a head or neck rest with a vibration and sound actuator, and optionally arm rests and/or foot rests.

According to an advantageous feature of the invention the frame structure is configured as a support part of the seat or the frame structure is configured as an additional structure to the seat's support parts or the frame structure is configured as a sound board for the vibration source.

According to an advantageous feature of the invention the sound reproduction assembly comprises at least two elastic elements and at least one of which is a normal elastic element allowing motion in normal direction and at least one of which is a lateral elastic element allowing motion in lateral direction.

According to an advantageous feature of the invention the seat rest of the seat is elastically coupled to a floor or corresponding structure by at least one lateral elastic element for local enhancement of sound perception via lateral vibration.

According to an advantageous feature of the invention the seat comprises further a swing mechanism connected to the frame structure in the back rest for the swinging vibration effect of the back rest due to the swing mechanism.

According to an advantageous feature of the invention the seat comprises one or more normal elastic elements connected to the back rest and one or more lateral elastic elements connected to the seat rest for vibration effect of the back rest as rotation vibration and vibration effect of the seat rest as translation vibration.

According to an advantageous feature of the invention the seat comprises one or more normal elastic elements connected to the back rest and one or more lateral elastic elements connected to the seat rest for vibration effect of the back rest as rotation vibration and vibration effect of the seat rest and the arm rests as lateral translation vibration.

According to an advantageous feature of the invention the seat comprises one or more normal elastic elements connected to the back rest and one or more lateral elastic elements connected to the seat rest for vibration effect of the back rest as rotation vibration and vibration effect of the seat rest and the foot rests as lateral translation vibration.

According to an advantageous feature of the invention the seat further comprises one or more lateral elastic elements connected to the seat rest and to the floor for vibration effect of at least the seat rest as swinging translation vibration.

According to an advantageous feature of the invention sound reproduction assembly is provided to deliver lumbar vibration in frequencies 20 to 100 Hz.

According to an advantageous feature of the invention the whole seat is arranged to vibrate mainly laterally from 15 to 60 Hz.

In accordance with an advantageous aspect of the invention only one sound, advantageously stereo actuator set behind shoulders or head is used for good airborne sound radiation, and good vibration feeling is provided in most parts of the seat using mechanically tuned frame structure/-s with elastic mounting and the vibration energy is efficiently transmitted to other parts of the seat using elastically mounted, mechanically tuned frame structure/-s. Thus, lateral vibration of the surface is perceived equally well as vibration in direction normal to skin contact. Mechanical energy transmission (impedance match) is good as skin and fat are not so stiff in lateral direction as in normal to surface and therefore more vibration movement and human perception is achieved in the seat with less power used for creating the vibration energy. The invention also provides good energy efficiency and electrical safety as only low voltages and currents need to be used. Further it should be noted that very little or no heating effect occurs, which provides for good comfort of the user.

The seat described herein may be employed in domestic, recreational and professional domains of various types. As a few examples in this regard, the seat may be provided as an armchair or a bed or a coach or a divan for domestic or public use, as a seat, such as a car seat of a vehicle (in a car, in a bus, in a truck, in a train, in an airplane, etc.), as a seat of a public space such as a movie theatre, an auditorium, a conference room, a hotel etc.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

In the interest of editorial clarity of the description, in the following we predominantly refer to the sound and vibration generating arrangement (e.g. means for jointly producing vibration and sound) as sound reproduction means, as a sound reproduction assembly, as vibration means or as a vibration assembly.

BRIEF DESCRIPTION OF THE DRAWINGS

Aspects of the invention, however, both as to its construction and its method of operation, together with additional objects and advantages thereof, will be best understood from the following description of some example embodiments when read in connection with the accompanying drawings and in the following the invention is described in more detail referring to the accompanying drawing, in which in FIG. 1A is schematically shown an example of main principles of a sound reproduction assembly for a seat according to the invention, in FIG. 1B is schematically shown an example of an arrangement for an advantageous sound reproduction assembly for a seat according to the invention, in FIGS. 2A and 2B is schematically shown normal vibration (FIG. 2A) and lateral vibration (FIG. 2B), in FIG. 3 is schematically shown an advantageous example of a seat according to the invention, in FIG. 4 is schematically shown another advantageous example of a seat according to the invention, in FIG. 5 is schematically shown yet another advantageous example of a seat according to the invention, and in FIG. 6 is schematically shown yet another advantageous example of a seat according to the invention and in FIG. 7 is schematically shown yet another advantageous example of a seat according to the invention.

DESCRIPTION OF THE PREFERRED EMBODIMENTS

During the course of the following description like numbers and signs will be used to identify like elements according to the different views which illustrate the invention and its advantageous examples. In the figures some repetitive reference signs have been omitted for clarity reasons. Various example embodiments of the present invention relate to a seat that is provided with a vibration assembly for joint production of vibration and sound.

Figure 1A:
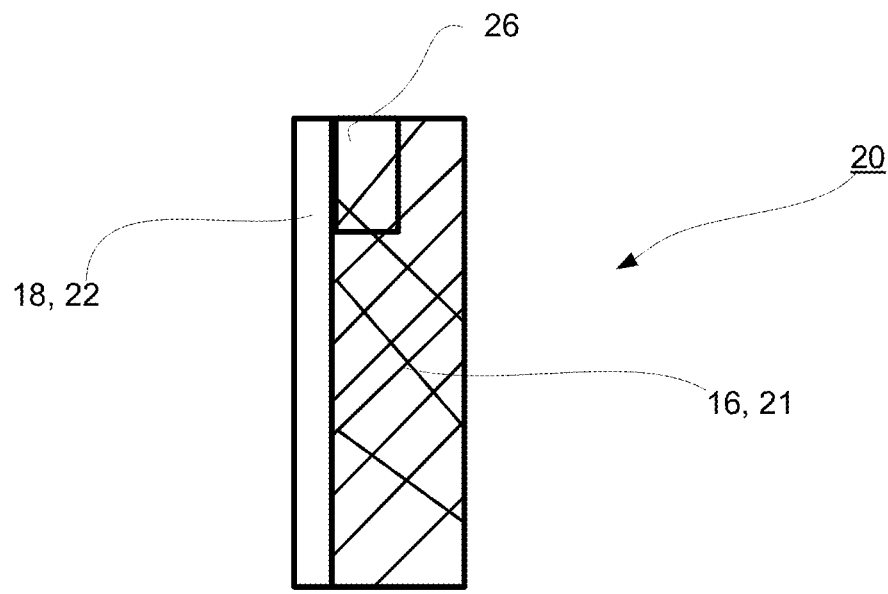

In FIG. 1A is schematically shown an example of main principles of a sound reproduction assembly for a seat. The sound reproduction assembly 20 comprises a frame structure 18, 22 and elastic, non-homogenous element/-s 16, 21 and the vibration and sound source 26. The elastic, non-homogenous element/-s 16, 21, the frame structure 18, 22 and the vibration source 26 provide an elastically mounted, mechanically tuned frame structure for the seat. The vibration and sound source 26 is advantageously the type of as described in the EP patent application publication EP 3097703 but other types of vibration sources can also be used. The sound and vibration source 26 is attached rigidly or via elastic mounting to the frame structure 18,22 that is elastically mounted to a part or parts of a seat (FIGS. 1B, 3-7) with non-homogenous support or support arrangement 16, 21, that may consist of elastic zones or non-homogenous elasticity. The sound and vibration source 26 transmits the to the frame structure 18, 22 that is supported by elastic elements 16, 21 that determine together with the mass distribution of the frame the vibration modes and resonance frequencies of the frame. The elastic elements 16, 21 are chosen based on the desired movement of the frame structure 18, 22. The elastic element 16, 21 may be for example elastic material, such as foam type plastic material, rubber, of for example elastic mechanical part, such as a spring or a torsion rod. By means of the non-homogeneity of the elastic material it is possible to create an articulation effect to alter the vibration effect e.g. emphasize some frequencies and optimize the amplitude distribution and direction of surface vibration. The frame structure 18, 22 may be for example a board or a panel or a pipe or a rod type structure.

Figure 1B:
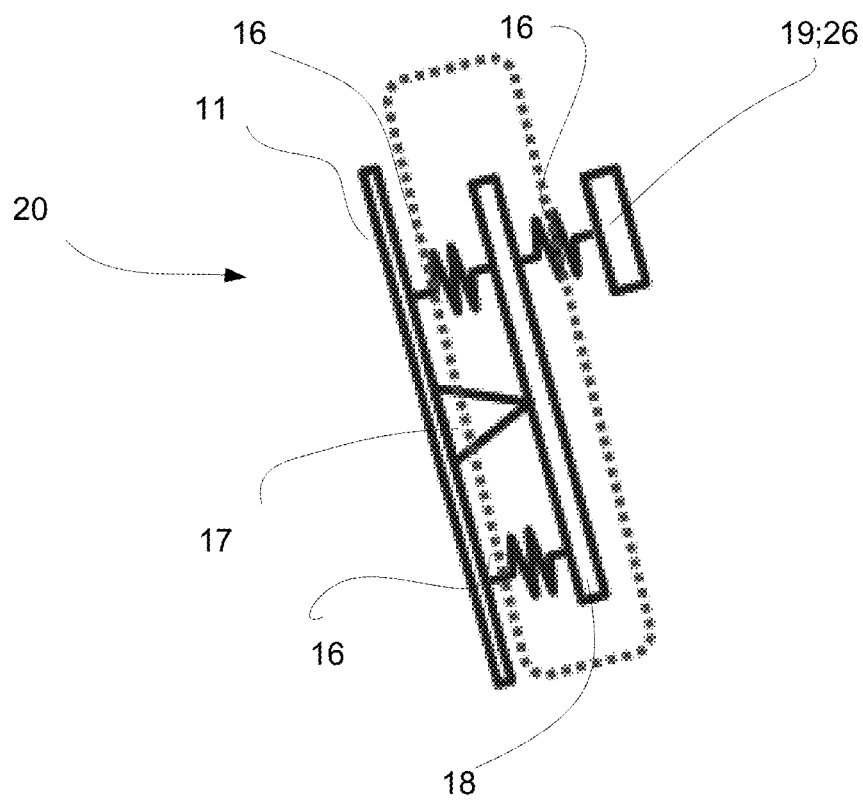

In FIG. 1B is schematically shown an example of an arrangement for an advantageous sound reproduction assembly 20 for a seat located inside padding, shown by the dashed line of a part of the seat, which is elastically coupled to a head rest or a neck rest 19, which contains also the vibration and sound source 26 by a first normal elastic element 16 to a frame structure 18 connected to the back rest 11 of the seat 10 by a swing mechanism 17 and a pair of second elastic elements 16 located at each side of turning vibration movement provided by the swing mechanism 17. The rigid frame structure 18 is supported by elastic elements 16 and tuned to resonate and thus, by the swing mechanism 17 and the elastic elements 16 a rotational vibration zone is provided in the middle area of the backrest 11 in height direction and tune resonance zones above and below the middle area. Swing mechanism 17 is stiff on normal direction to serve its purpose, but it may or may not be stiff in lateral direction.

Figure 2A:
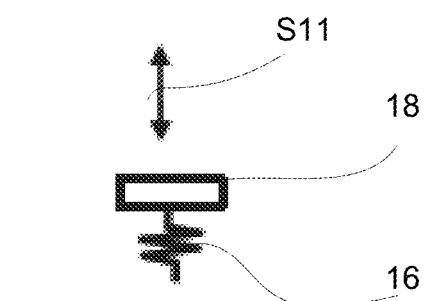
Figure 2B:
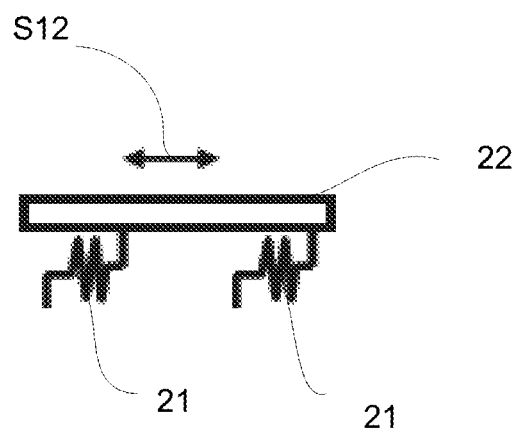

In FIGS. 2A and 2B is schematically shown examples of normal vibration (FIG. 2A) and lateral vibration (FIG. 2B) generated by the sound reproduction means by frames with elastic mounting in normal (FIG. 2A) and lateral (FIG. 2B) directions. In normal vibration the effect of the vibration generated by the sound reproduction means 20 (FIG. 2A) or generated by the sound reproduction means and transmitted by the frame structure 22 (FIG. 2B) is perceived in substantially perpendicular direction to skin contact and in lateral vibration the effect of vibration generated by the sound reproduction means is perceived substantially in direction of the skin contact plane. The direction of the effect of the vibration is provided by arranging elastic coupling by normal elastic elements 16 and lateral elastic elements 21, which in normal vibration transfer the vibration substantially in the perpendicular direction to skin contact via the normal elastic elements 16 and in lateral vibration transfer the vibration substantially in the direction of the skin contact via the lateral elastic elements 21. The elastic coupling between the sound reproduction means and the part of the seat or between the sound reproduction means and the frame structure may be selected such that the elastic coupling serves as an arrangement for mechanically transmitting the vibration effect generated by the sound reproduction means 20 to the other body parts of the seat to generate the lateral vibration produced by the sound reproduction means 20 and transmitted by the frame structure 22 to selected structures of the seat. In the following advantageous examples of pieces of seat according to the invention one or more normal and lateral elastic elements 16, 21 to implement the elastic coupling the desired effect of vibration may be provided by suitable selection of the elastic element stiffness constant $k1$, which depends on the target resonance frequency and the effective mass in the vibration mode in the arrangement formed by the sound reproduction means 20. Thus, as shown in the following advantageous examples of the invention only one sound, advantageously stereo actuator 20 set behind shoulders or head is used for good airborne sound radiation, and good vibration feeling is provided in most parts of the seat and the vibration energy is efficiently transmitted to other parts of the seat, without additional actuators. Thus, lateral vibration is perceived equally well as vibration in direction normal to skin contact. Mechanical energy transmission (impedance match) is good for a person contacting on the surface, as skin and fat are not so stiff in lateral direction as in normal to surface and therefore more vibration movement is achieved in the seat with less power used for creating the vibration stimulus and human perception of vibration.

Figure 3:
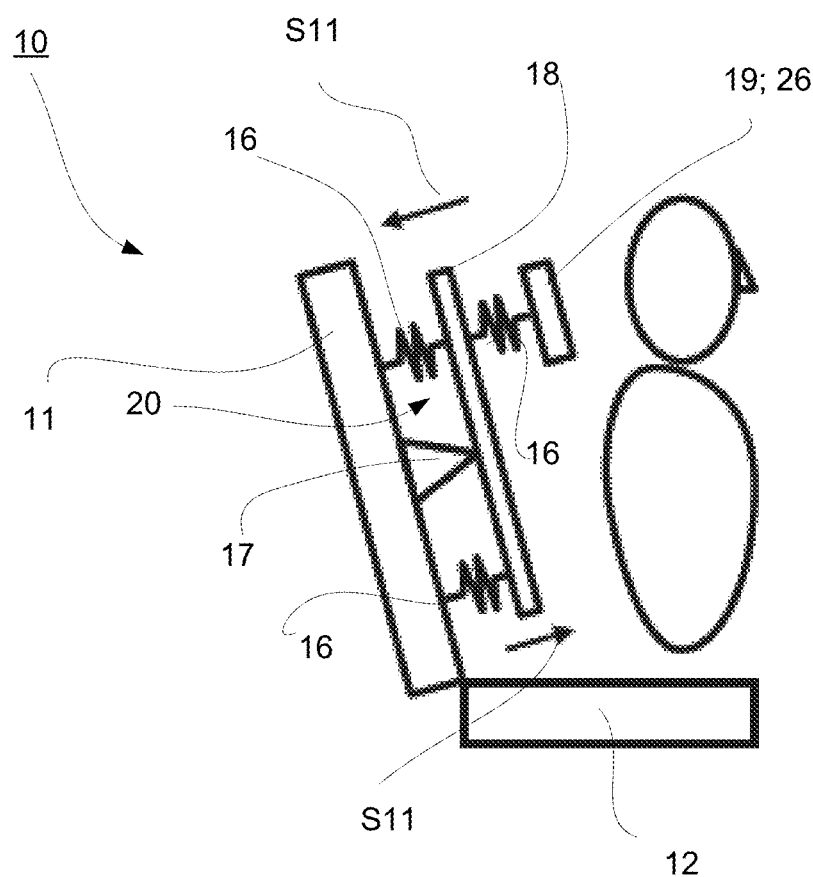

In FIG. 3 is schematically shown some components of a seat 10, which in this example is a chair type seat, according to an example of the present invention. In FIG. 3 the seat 10 is shown with a head rest or a neck rest 19, a backrest 11 and a seat rest 12 (i.e. the part of a seat 10 intended for sitting on) that represent components of a body of the seat 10. FIG. 3 further shows a sound reproduction assembly 20 located inside padding of a part of the seat, in this example inside the padding of the head rest or the neck rest 19, which is elastically coupled by a first normal elastic element 16 to the frame structure 18 connected to the back rest 11 of the seat 10 by a swing mechanism 17 and a pair of second elastic elements 16 located at each side of turning vibration movement provided by the swing mechanism 17. The rigid frame structure 18 is supported by elastic elements 16 and tuned to resonate and thus, by the swing mechanism 17 and the elastic elements 16 a rotational vibration zone is provided to the backrest 11. The second elastic elements and the swing mechanism 17 are then coupled to the back rest of the seat 10. As shown by the arrows S11 in FIG. 3 the vibration energy generated by the vibration and sound actuator 26, which is located inside the head or neck rest 19 is transmitted by the normal elastic elements 16 to the frame structure 18, which in turn provides for the swinging vibration movement due to the swing mechanism 17 and back and forth moving "swinging" vibration effect. This example provides thus a seat 10 with back rest 11 local enhancement of vibration perception via vibration generated by the vibration and sound actuator 26 by the swing mechanism 17 mounted substantially in the middle in the longitudinal direction of the back rest, and thus surface of the back rest 11 is rotated around the center. Thus, lumbar vibration enhancement with less vibration to shoulder bones and chest, which are very sensitive to vibration, is achieved. In this example the vibration effect is mainly normal vibration to back contact of the user of the seat 10. The body of the seat 10, in turn, may be attach to a base (now shown) that includes a rigid or substantially rigid structure for mounting the seat 10 to its environment, e.g. to a floor or to an installation platform arranged on top of the floor. In this the seat 10, the elastic coupling between sound reproduction means 20 and the body of the seat 10 is provided as one or more elastic elements 16 mounted mechanically tuned to frame structure 18. Instead of using one or more elastic elements 16, elastic materials of other types may be employed.

Figure 4:
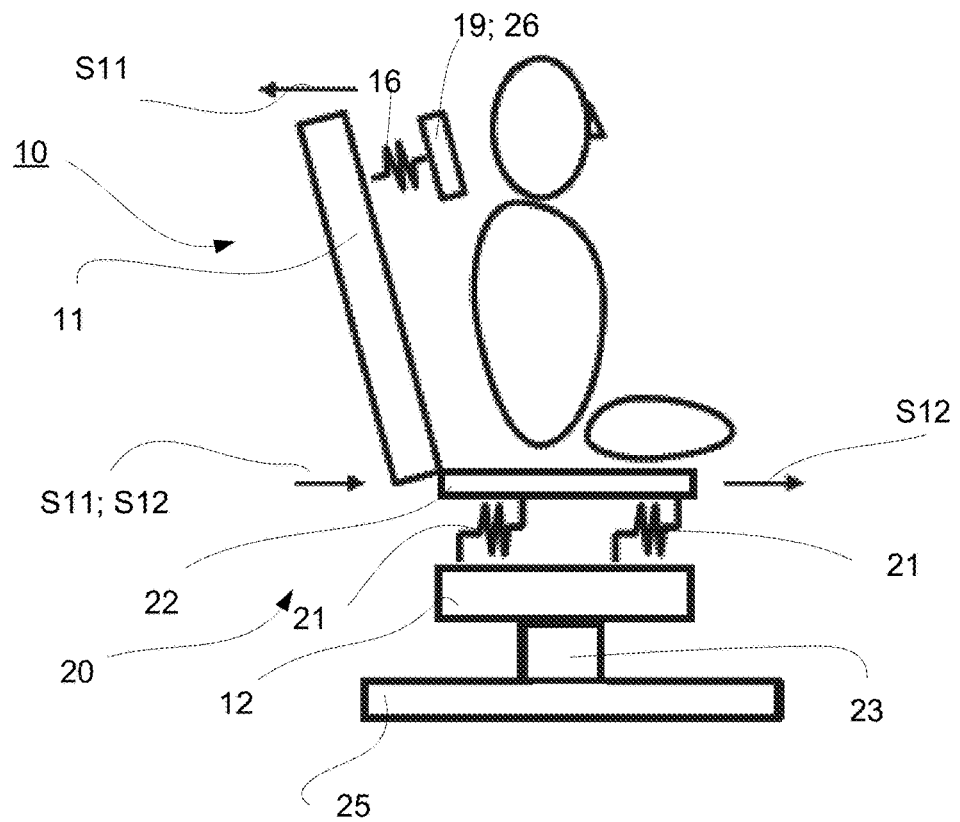

In the example of FIG. 4, the sound reproduction means 20 with the vibration and sound actuator 26, advantageously stereo actuator, is arranged in the head rest or the neck rest 19 of the seat 10 or configuration according to FIG. 3 is used in the back rest 11. In this example a chair type seat is presented. In the FIG. 4 the seat 10 is shown with a head or neck rest 19, a backrest 11 and a seat rest 12 that represent components of a body of the seat 10. The seat rest 12 is connected to a floor 25 or to a corresponding structure by frame part 23. The seat rest 12 comprises a frame structure 22 with lateral elastic elements 21 within the padding of the seat rest 12 providing lateral vibration movement of the seat rest 12 surface shown by arrows S12. The sound reproduction assembly 20 is arranged inside a padding of the seat 10. As shown by the arrows in FIG. 4 the vibration energy generated by the vibration and sound actuator 26 is transmitted by the elastic element 16 to the back rest 11, as mentioned the sound reproduction arrangement in this example for the back rest 11 can also be constructed as shown in connection with FIG. 2. This example provides thus a seat 10 with the head or neck rest 19 local enhancement of sound perception via vibration generated by the vibration and sound actuator 26 as shown by arrows S11, S12. In this example the vibration effect in the back rest 11 is mainly normal vibration to back contact of the user of the seat 10 and the vibration effect in the seat rest 12 is mainly lateral vibration due to the frame structure 22 vibration movement in lateral direction effected by the lateral elastic elements 21. The body of the seat 10, in turn, is attached to a floor 25 base by a rigid or substantially rigid frame part 23 for mounting the seat 10 to its environment. In this the seat 10, the elastic coupling between sound reproduction means 20 and the body of the seat 10 is provided as one or more normal elastic elements 16 and one or more lateral elastic elements 21. In the FIG. 4 schematically shown example of the vibration effect for the back rest and seat rest surface of the seat 10, the vibration effect of the back rest 11 is rotation vibration as a whole or as in embodiment of FIG. 4 and the vibration effect of the seat rest 12 is translation vibration thus providing for the back of the user lumbar normal vibration and for the behind and legs of the user lateral vibration. In this example lateral flexibility with rigid support vertically is achieved. Further, in another embodiment, lateral elastic elements 21 may have and usually will have in practice some flexibility also in normal direction, allowing slight normal vibration also in seat rest frame structure 22, and some lateral vibration in back rest 11.

Figure 5:
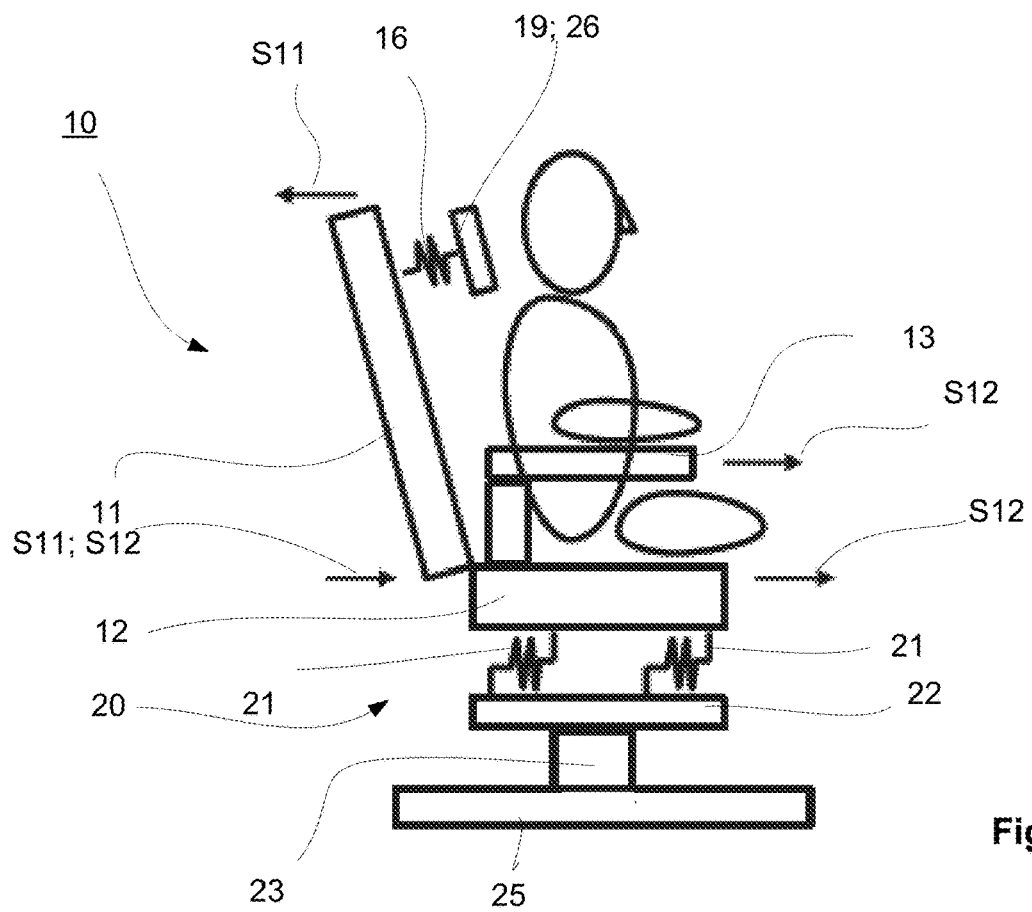

In the example of FIG. 5, the sound reproduction means 20 with the vibration and sound actuator 26, advantageously stereo actuator, is arranged in the seat 10. In FIG. 5 the seat 10, which in this example is a chair type seat, is shown with a head or neck rest 19, a backrest 11 a seat rest 12 and arm rests 13 that represent components of a body of the seat 10. The seat rest 12 is connected to a floor 25 or a corresponding structure by frame part 23. The seat rest 12 comprises a frame structure 22 with lateral elastic elements 21 within the padding of the seat rest 12 providing lateral vibration movement of the seat rest 12 surface shown by arrows S12. FIG. 5 further shows a sound reproduction assembly 20 elastically coupled by an elastic element 16 to the back rest 11 of the seat 10. As shown by the arrows in FIG. 5 the vibration energy generated by the vibration and sound actuator 26 is transmitted by the elastic element 16 to the back rest 11. Naturally the sound reproduction arrangement in this example for the back rest 11 can also be constructed as shown in connection with FIG. 3. This example provides thus a seat 10 with local enhancement of sound perception via vibration generated by the vibration and sound actuator 26 as shown by arrows S11, S12. In this example the vibration effect in the back rest 11 is mainly normal vibration to back contact of the user of the seat 10 and the vibration effect in the seat rest 12 and arm rests 13 is mainly lateral vibration due to the frame structure 22 vibration movement in lateral direction effected by the lateral elastic elements 21. The body of the seat 10, in turn, is attached to a floor 25 base by a rigid or substantially rigid frame part 23 for mounting the seat 10 to its environment. In this the seat 10, the elastic coupling between sound reproduction means 20 and the body of the seat 10 is provided with one or more normal elastic elements 16 and one or more lateral elastic elements 21. In the FIG. 5 schematically shown example of the vibration effect for the back rest and seat rest and arm rest surface of the seat 10, the vibration effect of the back rest 11 is rotation vibration as a whole and the vibration effect of the seat rest 12 and of the arm rests 13 is translation vibration thus providing for the back of the user lumbar normal vibration and for the behind, arms and legs of the user lateral vibration and the whole seat is configured as mechanically tuned frame structure. In this example lateral flexibility with rigid support vertically is achieved.

Further, in another embodiment, lateral elastic elements 21 may have and usually will have in practice some flexibility also in normal direction, allowing more efficient vibration mode in the seat 10. For instance, slight normal vibration also in the seat rest 12 and of the arm rests 13, and some lateral vibration in back rest 11.

Figure 6:
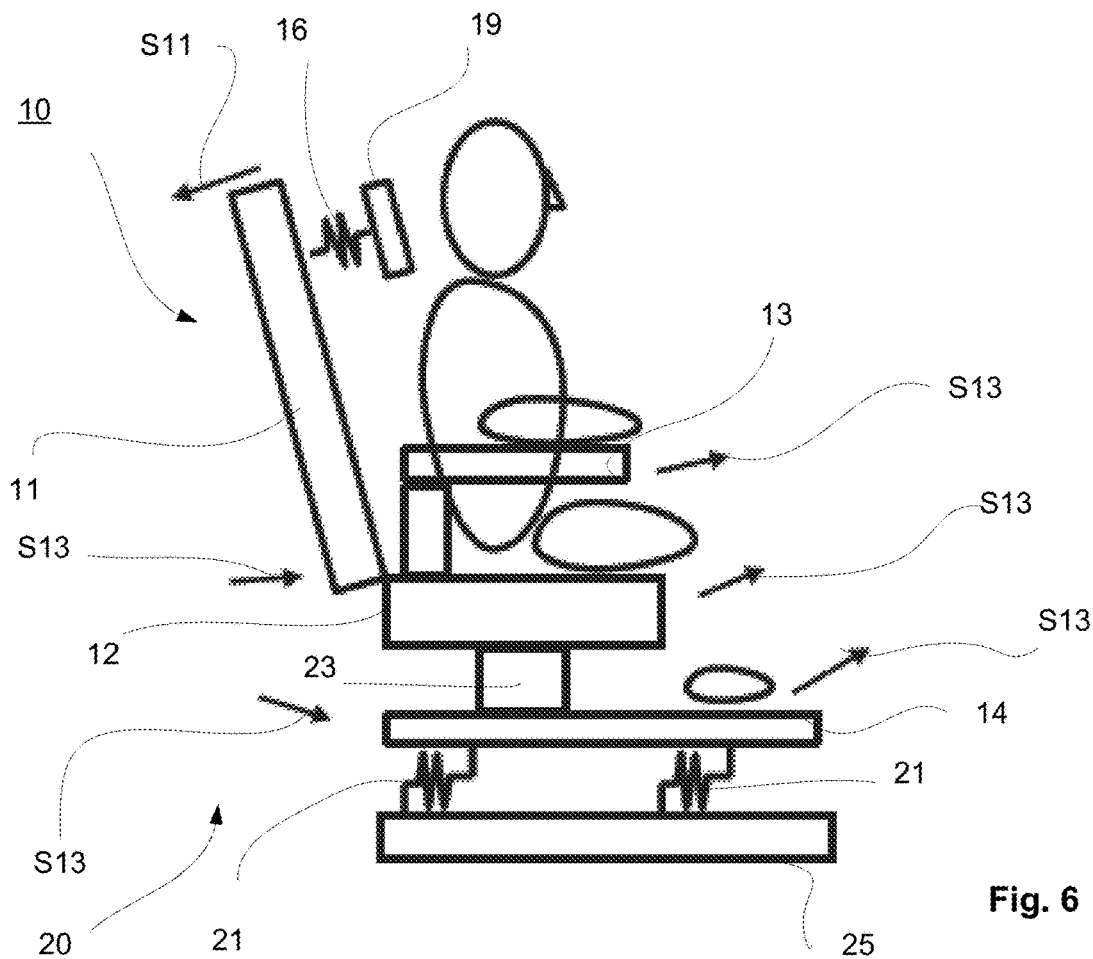

In the example of FIG. 6, the sound reproduction means 20 with the vibration and sound actuator 26, advantageously stereo actuator, is arranged in the seat 10, which in this example is a chair type seat. In FIG. 6 the seat 10 is shown with a head or neck rest 19, a backrest 11, a seat rest 12, foot rests 14 and arm rests 13 that represent components of a body of the seat 10. The seat rest 12 is connected to a floor 25 or a corresponding structure by a frame part 23 connected by a frame structure 22 with lateral elastic elements 21 to the floor 25. In this example swinging lateral vibration movement of the seat rest 12, arm rests 13 and foot rests 14 is provided as shown by arrows S13. FIG. 6 further shows a sound reproduction assembly 20 elastically coupled by a normal elastic element 16 to the back rest 11 of the seat 10. As shown by the arrows in FIG. 6 the vibration energy generated by the vibration and sound actuator 26 is transmitted by the elastic elements 16 to the back rest 11. Naturally the sound reproduction arrangement in this example for the back rest 11 can also be constructed as shown in connection with FIG. 3. This example provides thus a seat 10 local enhancement of sound perception via vibration generated by the vibration and sound actuator 26 as shown by arrows S11, S13. In this example the vibration effect in the back rest 11 is mainly normal vibration to back contact of the user of the seat 10 and the vibration effect in the seat rest 12 and arm rests 13 and foot rests 14 is mainly swinging lateral vibration as shown by arrows S13 due to the frame structure 22 vibration movement in lateral direction effected by the lateral elastic elements 21 connected to the floor 25. In this example the seat 10, the elastic coupling between sound reproduction means 20 and the body of the seat 10 is provided as one or more normal elastic elements 16 and one or more lateral elastic elements 21. In the FIG. 6 schematically shown example of the vibration effect for the whole seat 10 and the foot rest 14 due to the substantially rigid seat rotating vibration movement around its center of gravity and thus the backrest vibration is mainly rotation vibration and the seat rest and arm rests vibration translation vibration. In this example back of the user receives lumbar normal vibration and behind, legs, feet and arms or the user mainly lateral vibration. This example is for mainly very low frequency effects, from 40 to 15 Hz.

Figure 7:
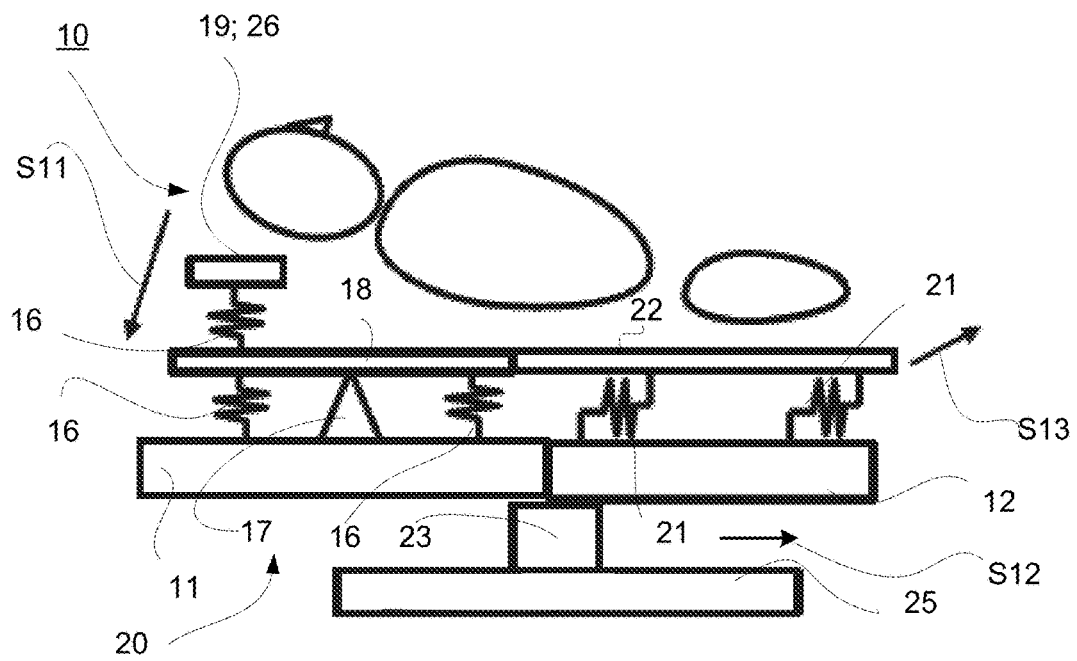

In FIG. 7 is schematically shown some components of a seat 10, which in this example is used as a bed type piece of furniture, according to an example of the present invention. The seat 10 is shown with a head or neck rest 19, a backrest 11 and a seat rest 12 (which in this type of a seat 10 is intended for the behind of the user to lay on) that represent components of a body of the seat 10. FIG. 3 further shows a sound reproduction assembly 20 located inside padding of a part of the seat, in this example inside the padding of the backrest 11, which is elastically coupled to the head or neck rest 19 by a first normal elastic element 16 to a frame structure 18 connected to the back rest 11 of the seat 10 by a swing mechanism 17 and a pair of second elastic elements 16 located at each side of turning vibration movement provided by the swing mechanism 17. The rigid frame structure 18 is supported by elastic elements 16 and tuned to resonate and thus, by the swing mechanism 17 and the elastic elements 16 a rotational vibration zone is provided in the middle area of the backrest 11 in height direction and tune resonance zones above and below the middle area. The second elastic elements and the swing mechanism 17 are then coupled to the back rest of the seat 10. As shown by the arrows S11 the vibration energy generated by the vibration and sound actuator 26 is transmitted by the normal elastic elements 16 to the frame structure 18, which in turn provides for the swinging vibration movement due to the swing mechanism 17 and back and forth moving "swinging" vibration effect. The back rest 11 and the seat rest 12 are connected to a floor 25 or a corresponding structure by frame part 23. The seat rest 12 comprises a frame structure 22 with lateral elastic elements 21 within the padding of the seat rest 12 providing lateral vibration movement of the seat rest 12 surface shown by arrows S12. This example provides thus a seat 10 with local enhancement of sound perception via vibration generated by the vibration and sound actuator 26 as shown by arrows S11, S12. In this example the vibration effect in the back rest 11 is mainly normal and rotational vibration to back contact of the user of the seat 10 and the vibration effect in the seat rest 12 is mainly lateral vibration due to the frame structure 22 vibration movement in lateral direction effected by the lateral elastic elements 21. The body of the seat 10, in turn, is attached to a floor 25 base by a rigid or substantially rigid frame part 23 for mounting the seat 10 to its environment. In this the seat 10, the elastic coupling between sound reproduction means 20 and the body of the seat 10 is provided with one or more normal elastic elements 16 and one or more lateral elastic elements 21. In the FIG. 7 schematically shown example of the vibration effect for the back rest and seat rest surface of the seat 10, the vibration effect of the back rest 11 is rotation vibration as a whole and the vibration effect of the seat rest 12 is translation vibration thus providing for the back of the user lumbar normal vibration and for the behind, arms and legs of the user lateral vibration and the whole seat is configured as mechanically tuned frame structure. In this example lateral flexibility with rigid support mainly vertically is achieved. In this the seat 10, the elastic coupling between sound reproduction means 20 and the body of the seat 10 is provided as one or more elastic elements 16 mounted mechanically tuned to frame structure 18. Instead of using one or more elastic elements 16, elastic materials of other types may be employed.

In the examples, the coupling between sound reproduction means 20 and the body of the seat 10 is provided at least by one or more normal elastic elements 16 and advantageously by one or more lateral elastic elements 21. The characteristics of the mechanical tuning provided the elastic elements 16, 21 depends on the resonance frequency of the arrangement formed by the sound reproduction means 20, the elastic elements 16, 21 and the body of the seat 10, and hence such an arrangement provides mechanical tuning at desired frequencies and the resonance frequencies. The elastic coupling between body of the seat 10 and the floor 25 may be provided as one or more lateral elastic elements 21. Instead of using one or more elastic elements, elastic materials of other type may be employed.

In the examples arrangements of the back rest 11 to deliver lumbar vibration to lower back of the user in frequencies 20 to 100 Hz, of lateral vibration to the seat rest 12 and the arm rests 13 with human contact, of the whole seat 10 elastic mounting to vibrate mainly laterally in frequencies 15 to 60 Hz is provided.

The characteristics of the elastic coupling between the body of the seat 10 and the floor 25 may be selected such that the elastic coupling serves as an isolation arrangement for mechanically isolating the sound reproduction means 20 from the floor 25 and such mechanical isolation may be provided by suitable selection of the elastic element characteristics.

In addition to coupling the sound reproduction means 20 to the frame structure 18, 22 inside the padding can be provided in a rigid or essentially rigid manner in the seat 10 and the sound reproduction means 20 may be further coupled in a rigid or substantially rigid manner to one or more (rigid or substantially rigid at the frequency range in question frame structures 18, 22 arranged inside a respective part of the padding of the seat 10 as this arrangement further enhances transferring the vibration from the sound reproduction means 20 to a person sitting in the seat 10 via a large contact area for improved perception of frequency content of a soundscape carried in the input audio signal used to drive the sound reproduction means 20.

The frame structure 18, 22 may also be mounted by the outer fabric of the seat 10, which fabric thus provides the elastic element 16, 21. For example the frame structure 18, 22 may be provided with articulated attachment in the middle area and the areas around it may move in vibration movement supported by the fabric. Also, the frame structure 18, 22 may be configured to be floating in support of the outer fabric of the seat.

The seat 10 may further comprise mechanical control means that enables a user to separately adjust the intensity (e.g. level or amplitude) of the vibration/sound at least in two frequency bands. Control means that enable such adjustment of vibration/sound intensity may be employed to provide the seat 10 with means for adjusting intensity of the sound radiated through said at least one outer surface of the padding and/or with means for adjusting intensity of the vibration and sound on said at least one outer surface of the padding. Control means may be e g adjusting the frame structure orientation so that the elastic elements get more compression and become stiffer and thus change the intended resonance frequency of the assembly. Another control means is adjusting directly the elastic parts or connecting frame structures to change their rigidity.

As described in the foregoing, the sound reproduction means 20, e.g. in accordance with the examples described in context of the pieces of seat 10 in the foregoing, comprises at least one mechanical actuator and at least one frame structure arranged inside the padding of the seat, wherein said at least one mechanical actuator is arranged to vibrate in accordance with the input audio signal provided thereto. The seat comprises sound and vibration generating arrangement for jointly producing vibration and sound to reproduce an audio signal provided as input thereto, where the sound and vibration generating arrangement is provided inside a padding of the seat to generate mechanical vibration that is perceivable as a vibration and sound on at least one outer surface of the padding and to radiate a sound through said at least one outer surface of the padding.

The sound and vibration generating arrangement may be also referred to as means for jointly producing vibration and sound to reflect the fact that there is a plurality of ways to implement such an arrangement inside the padding of the seat.

The frame structures 18, 22 can be constructed as boards arranged inside the corresponding padding and may extend to the full or substantially full length of the corresponding rest of the seat or the board may cover only a part of the full length of the corresponding rest. Nevertheless, due its rigidity the board arranged in the corresponding rest transfers vibration received from the sound reproduction means 20 to a person sitting in the seat 10 via a large contact area, thereby providing enhanced perception of tactile and audio tactile frequencies for improved perception of low frequency content of a soundscape carried in the input audio signal used to drive the sound reproduction means 20.

It should be noted that the features of the above examples can be combined with each other to form corresponding pieces of seat with enhanced sound reproduction. Also, more actuators than one may be used for either sound generation or vibration enhancement, using the same principles of optimizing the vibration energy flow described in the embodiments of one stereo actuator source arrangement.

In the description in the foregoing, although some functions have been described with reference to certain features, those functions may be performable by other features whether described or not. Although features have been described with reference to certain embodiments or examples, those features may also be present in other embodiments or examples whether described or not. Above the invention has been described by referring to some advantageous examples only to which the invention is not to be narrowly limited. Many modifications and alterations are possible within the inventive idea.

The invention claimed is:

1. A seat arranged for enhanced sound perception via vibration, the seat comprising:
    a padding; and
    a sound reproduction assembly (20) which comprises at least one vibration source (26) that produces vibrations, at least one elastic element (16, 21), and at least one frame structure (18, 22),
    wherein at least the at least one elastic element (16, 21) and the at least one frame structure (18, 22) of the sound reproduction assembly are at least partially arranged inside the padding,
    wherein the at least one elastic element (16, 21) is a non-homogenous element and is located in contact with the at least one frame structure (18, 22) and the at least one vibration source (26), and
    wherein the at least one elastic element (16, 21) is configured to provide mechanically tuned mounting and the at least one elastic element (16, 21) is configured to create at least lateral vibration to the surface of the seat, the at least one elastic element (16, 21) providing an elastic coupling between the at least one vibration source (26) and the at least one frame structure (18, 22), the elastic coupling mechanically transmitting the vibration generated by the at least one vibration source (26), via the at least one frame structure (18, 22), to other body parts of the seat to create the at least lateral vibration to the surface of the seat.

2. The seat according to claim 1, further comprising a back rest (11), a seat rest (12), and a head or neck rest (19),
    wherein a vibration and sound actuator (26) comprises the at least one vibration source, and
    wherein the vibration and sound actuator (26) is located in the head or neck rest (19).

3. The seat according to claim 2, wherein the seat rest (12) is elastically coupled to a floor (25) or corresponding structure by at least one lateral elastic element (21) for local enhancement of sound perception via the at least lateral vibration.

4. The seat according to claim 2, wherein,
    the sound reproduction assembly (20) comprises at least two of said elastic elements (16, 21),
    at least one of said elastic elements (16) is a normal elastic element (16), and
    at least one of said elastic elements (21) is a lateral elastic element (21).

5. The seat according to claim 1, wherein the at least one frame structure (18, 22) is configured as one of the group consisting of:
    a support part of the seat,
    an additional structure to the seat's support parts, and
    a sound board for the vibration source (26).

6. The seat according to claim 5, wherein,
    the sound reproduction assembly (20) comprises at least two of said elastic elements (16, 21),
    at least one of said elastic elements (16) is a normal elastic element (16), and
    at least one of said elastic elements (21) is a lateral elastic element (21).

7. The seat according to claim 5, wherein the seat rest (12) is elastically coupled to a floor (25) or corresponding structure by at least one lateral elastic element (21) for local enhancement of sound perception via the at least lateral vibration.

8. The seat according to claim 1, wherein,
    the sound reproduction assembly (20) comprises at least two of said elastic elements (16, 21),
    at least one of said elastic elements (16) is a normal elastic element (16), and
    at least one of said elastic elements (21) is a lateral elastic element (21).

9. The seat according to claim 8, wherein the seat rest (12) is elastically coupled to a floor (25) or corresponding structure by at least one lateral elastic element (21) for local enhancement of sound perception via the at least lateral vibration.

10. The seat according to claim 1, further comprising:
    a back rest (11);
    a seat rest (12); and
    a swing mechanism (17) connected to the at least one frame structure (18) and to the back rest (11) for a swinging vibration effect of the back rest (11) due to the swing mechanism (17).

11. The seat according to claim 1, further comprising:
    a back rest (11); and
    a seat rest (12), wherein the at least one elastic element comprises one or more normal elastic elements (16) connected to the back rest (11) and one or more lateral elastic elements (21) connected to the seat rest (12) for vibration effect of the back rest (11) as rotation vibration and vibration effect of the seat rest (12) as translation vibration.

12. The seat according to claim 1, further comprising:
a back rest (11);
arm rests (13); and
a seat rest (12),
wherein the at least one elastic element comprises one or more normal elastic elements (16) connected to the back rest (11) and one or more lateral elastic elements (21) connected to the seat rest (12) for vibration effect of the back rest (11) as rotation vibration and vibration effect of the seat rest (12) and the arm rests (13) as translation vibration.

13. The seat according to claim 1, further comprising:
a back rest (11);
foot rests (14); and
a seat rest (12),
wherein the at least one elastic element comprises one or more normal elastic elements (16) connected to the back rest (11) and one or more lateral elastic elements (21) connected to the seat rest (12) for vibration effect of the back rest (11) as rotation vibration and vibration effect of the seat rest (12) and the foot rests (14) as translation vibration.

14. The seat according to claim 1, further comprising a seat rest (12) elastically coupled to a floor (25),
wherein the at least one elastic element further comprises one or more lateral elastic elements (21) connected to the seat rest (12) and to the floor (25) for vibration effect of at least the seat rest (12) as swinging translation vibration.

15. The seat according to claim 1, wherein sound reproduction assembly (20) is provided to deliver lumbar vibration in frequencies 20 to 100 Hz.

16. The seat according to claim 1, wherein the whole seat is arranged to vibrate mainly laterally from 15 to 60 Hz.

17. The seat according to claim 1, further comprising:
a back rest (11), a seat rest (12), a head or neck rest (19), and at least one of arm rests (13) and foot rests (14),
wherein a vibration and sound actuator (26) comprises the at least one vibration source, and
the vibration and sound actuator (26) is located in the head or neck rest (19).

18. The seat according to claim 1, further comprising:
a back rest (11);
a seat rest (12); and
a head or neck rest (19),
wherein a vibration and sound actuator (26) comprises the at least one vibration source, and
wherein the vibration and sound actuator (26) is located in the head or neck rest (19) outside of the padding,
wherein the at least one frame structure (18, 22) is enclosed within the padding, and
wherein the at least the at least one elastic element (16, 21) is partially arranged within the padding.

19. The seat according to claim 1, further comprising:
a back rest (11);
a seat rest (12);
a head or neck rest (19),
wherein a vibration and sound actuator (26) comprises the at least one vibration source, and
wherein the vibration and sound actuator (26) is located in the head or neck rest (19) outside of the padding,
wherein the at least one frame structure (18, 22) is arranged within the padding, and
wherein the at least the at least one elastic element (16, 21) is partially arranged within the padding, and
a swing mechanism (17) arranged within the padding and connected to the at least one frame structure (18) and to the back rest (11), the swing mechanism (17) being arranged to provide the back rest (11) with a swinging vibration effect.

* * * * *